Jan. 6, 1931.   A. DINA   1,787,426
COMPOUND VENTILATING SHUTTER
Filed June 5, 1929   2 Sheets-Sheet 1

Inventor
Augusto Dina
By his Attorney
Howard W. Dix

Jan. 6, 1931.                    A. DINA                    1,787,426
                    COMPOUND VENTILATING SHUTTER
                        Filed June 5, 1929         2 Sheets-Sheet 2
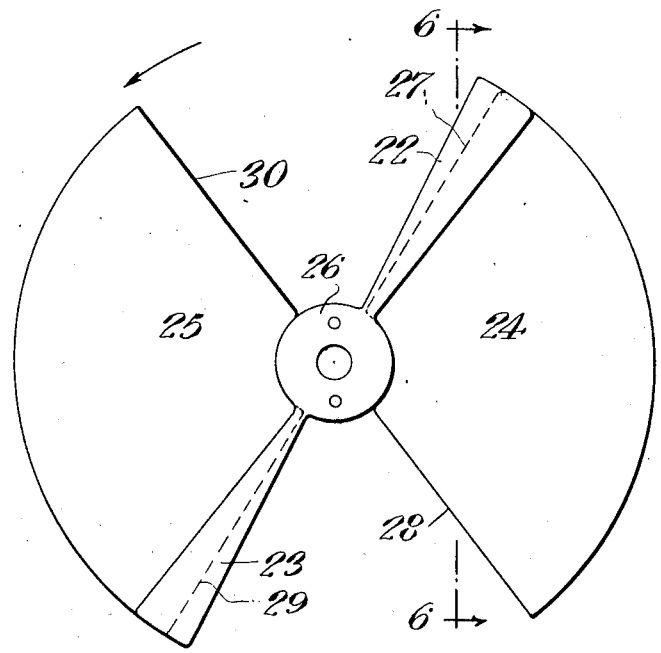
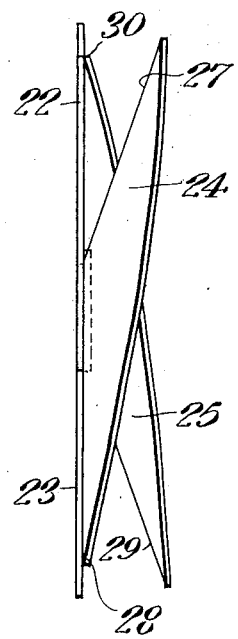
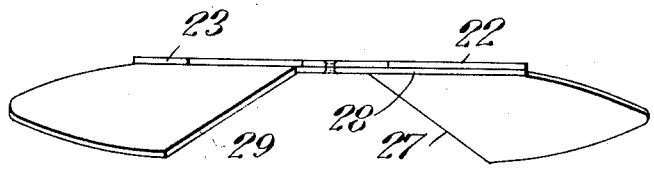
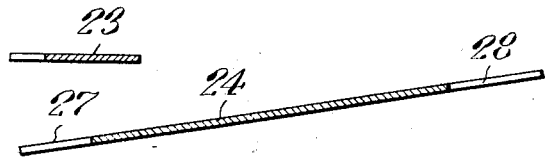
Inventor
Augusto Dina
By his Attorney Patented Jan. 6, 1931

1,787,426

UNITED STATES PATENT OFFICE

AUGUSTO DINA, OF JERSEY CITY, NEW JERSEY, ASSIGNOR TO INTERNATIONAL PROJECTOR CORPORATION, OF NEW YORK, N. Y., A CORPORATION OF DELAWARE

COMPOUND VENTILATING SHUTTER

Application filed June 5, 1929. Serial No. 368,480.

This invention relates to projectors and particularly to motion picture projectors and has especial reference to a new and improved shutter for the same.

In my co-pending application Serial Number 345,622 filed March 9, 1929 entitled "Shutter for motion picture projecting machines", there was described a shutter in which the blades were disposed at an angle to the plane of rotation thereof for the purpose of cooling and ventilating the projection head and the film, and with the trailing edge located in a smaller diameter of the projection beam than the leading edge in order to reduce the cutting time of the trailing edge and thereby increase the light efficiency of the shutter.

In the present invention the same general type of shutter is involved with the additional improvement that certain parts of the shutter are adjustable to vary the cooling and ventilating effect without changing the effective width across the plane of rotation and without changing the position of the trailing edge of the blade.

To this end, the main object of the invention is to provide a simple, efficient, and compact shutter blade of which at least a portion may be altered as to its angle with respect to the plane of rotation to vary the ventilating and cooling effects on the projection head and the film, while at the same time the effective width of the blade in the plane of rotation is unchanged so that the light cutting capacity of the blade is unchanged regardless of the variability of the angle of a portion thereof.

Further and more specific objects, features, and advantages will more clearly appear from the detailed description given below when taken in connection with the accompanying drawings which form part of the specification and which illustrate one preferred embodiment of the invention, and in which, Fig. 1 is a diagrammatic layout of the usual disposition of the shutter blade in the light projection beam;

Fig. 3 is an elevation of the blades forming the complete shutter;

Fig. 4 is a side elevation thereof;

Fig. 5 is a plan view thereof looking from the bottom of Fig. 3; and,

Fig. 6 is a sectional view taken on the line 6—6 of Fig. 3.

It may be generally stated that the invention aims to provide a shutter blade formed of a plurality of parts spaced apart, with some or all of them disposed at an angle to the plane of rotation but so disposed and over-lapped that even when the blade is cutting the light beam, no light will get through in spite of the fact that adjacent edges of the parts of the blade are separated. This separation permits the blade parts to be arranged at desired angles to vary the cooling and ventilating effects on the head and the film. In other words, no matter what the spacing of the parts of the blade is, the shadows overlap each other as to their adjacent edges so that no light gets through to the film as the blade is cutting the projection beam.

Figure 1:
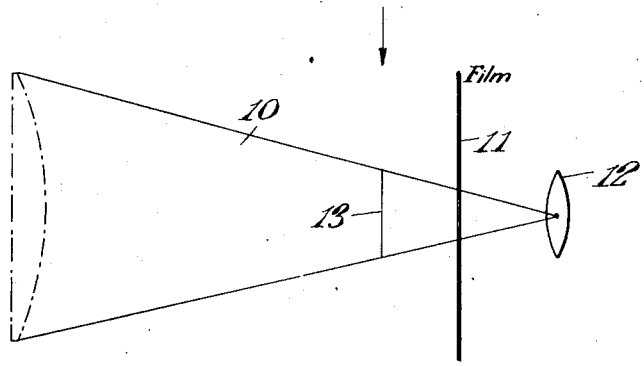

Referring to Fig. 1, the prior form of shutter blade is shown. It usually comprises a light beam 10 which tapers inwardly toward the film 11 and a lens 12, in the direction of the projection screen. Back of the film is disposed a shutter, one blade 13 of which is shown as just covering the beam 10 and in this instance the blade is entirely disposed in a plane at right angles to the axis of the beam. This is the usual disposition of the shutter blades in ordinary motion picture projectors.

Figure 2:
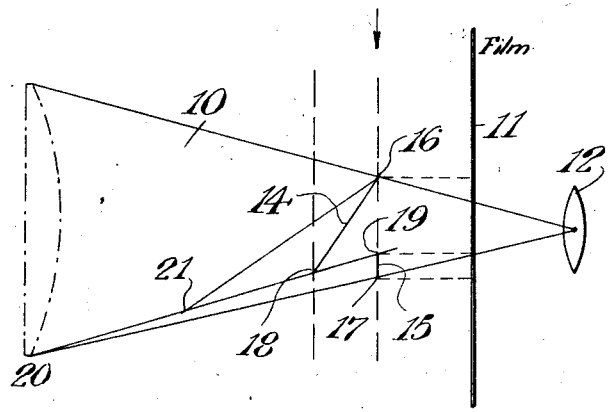
Fig. 2 is a similar view showing the form of blade embodying this invention.

Referring now to Fig. 2, there is shown a blade constructed in accordance with this invention so that at least a portion thereof is disposed at an angle to cool and ventilate the film and the head of the projection machine. This blade preferably comprises a portion 14 which is disposed at an angle to the plane of rotation of the blade as a whole and is preferably adjustable. Another portion 15 of the blade is preferably disposed in the plane of rotation and preferably fixed in position and as to its angle. The adjustable portion includes the trailing edge 16 whereas the fixed portion includes the leading edge 17. It will be seen that the adjacent edges 18 and 19 are spaced apart, and in different planes of rotation. The position of the portion 14 as shown in Fig. 2 is at a sharp angle with respect to the plane normal to the axis of the beam 10. In this position it will be observed that the width of the fixed portion 15 is sufficient to cover the adjacent edge 18 of the portion 14 so that even though the edges 18 and 19 are spaced apart, no light will reach the film, as the shutter is cutting the beam 10. This is more clearly perceived as it is noticed that the line 20—19 drawn from the outer edge of the beam to the top of the portion 15, is intercepted by the forward edge 18 of the portion 14 of the blade. If a sharper angle is desired than that made by the portion 14 as shown, then either the portion 15 must be made wider, or the adjustable portion 14 must be made longer so as to assume the position shown by the line 16—21, but in any event, the line 20—19 must be intercepted by the forward edge of the portion 14. In other words, it is apparent that the shadow or the projection forward of the front edge of the portion 14 must fall at all times within the width of the portion 15. Under such circumstances, the portion 14 may be adjusted at any desired angle without impairing the ability of the blade to completely cover the beam when cutting it.

Turning now to the actual form of the blade used, which is shown in Figs. 3 to 6 inclusive, it will be observed that each blade of the shutter, it being a two-bladed shutter, comprises small portions 22 and 23 which are preferably fixed in position and in angle to the plane of rotation. These small portions correspond to the portion 15 of the diagrammatic layout. The larger portions 24 and 25 which are preferably disposed at an angle to the plane of rotation and adjustable as to this angle at will. This adjustability may be temporary or made permanent after the initial setting. All of these portions are fixed to a central hub 26. The adjusting of the blades may be accomplished by any suitable structure, as for instance as disclosed in my co-pending application Serial Number 316,898, filed November 3, 1928.

Fig. 4 is a side elevation of the shutter looking from the right of Fig. 3 and from it, it will be seen that the leading edge 27 of the portion 24 is to the right of the portion 22, but, as seen in Fig. 3, behind it or in its shadow so to speak. The trailing edge 28 of the portion 24 is in the same plane with the portions 22 and 23. Similarly the leading edge 29 of the portion 25 is to the right of the portion 23 but, as noted above, it is in the shadow of that portion, and the trailing edge thereof is in the plane of the fixed portions 22 and 23. It is to be understood that the members 14, 24, or 25, may be of any desired length and adjustable so long as there is the proper over-lapping between 14 and 15 and between 22 and 24 and between 23 and 25. The trailing edges of these respective adjustable members may fall outside of the light beam 10. In any case, the leading edges of the portions 24 and 25 must always intercept the line 19—20 above mentioned. The portion 15 may be adjusted a little bit if desired to assist in the ventilating action.

Thus the invention has resulted in the ability to have a shutter blade which may be adjusted or varied as to the angle with regard to the plane of rotation and which will nevertheless have the same or a constant effective width with regard its ultimate covering angle relative to the beam, and the intervening spaces are effectively shadowed to prevent the transmission of light during the cutting movement of the blade.

While the invention has been described in detail and with respect to a preferred form thereof, it is to be understood that it is not to be limited to such forms or details since many changes and modifications may be made and the invention embodied in other forms without departing from the spirit and scope of the invention in its broader aspects. Hence it is desired to cover all forms and modifications coming within the language and scope of any one or more of the appended claims.

What is claimed, is,

1. A shutter for projectors which comprises a plurality of spaced separate fixed portions one of which is disposed at an angle to the plane of rotation of the blade, another portion disposed in the plane of rotation of the blade, said portions having their adjacent edges overlapping to prevent the transmission of light therethrough.

2. A shutter for projectors which comprises a plurality of spaced separate fixed portions, the leading one of which is disposed in the plane of rotation of the blade, the trailing one of which is disposed at an angle to the plane of rotation of the blade, the adjacent edges of said portions overlapping to prevent the transmission of light therethrough.

3. A shutter for projectors which comprises a plurality of spaced portions, the leading one of which is disposed in the plane of rotation of the blade, the trailing one of which is disposed at an angle to the plane of rotation of the blade, the trailing edge of the last named portion lying in the same plane as the first named portion, the adjacent edges of the portions being spaced apart but so related that they overlap to prevent the transmission of light therethrough.

4. A shutter for projectors which comprises a leading portion disposed in a plane normal to the axis of rotation, a trailing portion having its forward edge spaced to the rear of the leading portion and behind the same in an overlapping manner to prevent the transmission of light through the gap thus formed, the trailing portion disposed at an angle to the plane of rotation and having its trailing edge lying in the same plane as the leading portion of the blade.

5. A shutter for projectors which comprises a leading portion, a trailing portion disposed at an angle to the plane of rotation of the blade, the leading edge of the trailing portion disposed behind and apart from the leading portion and so disposed that its shadow will always fall within the width of the leading portion to prevent the transmission of light through the gap thus formed, the length of the trailing portion being varied to cover its portion of the beam as the angle at which the trailing portion is disposed is varied.

6. A shutter for projectors which comprises two blades oppositely disposed, each blade comprising a leading portion of small angular width, a trailing portion disposed at an angle to the plane of rotation of the blade with its leading edge in the shadow of the width of its respective leading portion, but spaced therefrom to provide a gap, the length of the trailing portion being varied to cover its part of the beam as the angle at which it is disposed is varied.

7. A shutter for projectors which comprises two blades oppositely disposed, each blade comprising a leading portion of relatively small angular width, a trailing portion of relatively large angular width and disposed at an angle to the plane of rotation of the blade with its leading edge in the shadow of the width of its respective leading portion, but spaced therefrom to provide a gap, the length of the trailing portion being varied to cover its part of the beam as the angle at which it is disposed is varied, the leading portion being disposed in the plane of rotation of the blade.

AUGUSTO DINA.